US012666378B2

(12) United States Patent
Liu et al.

(10) Patent No.: US 12,666,378 B2
(45) Date of Patent: Jun. 23, 2026

(54) METHOD AND APPARATUS FOR DETERMINING TIMING ADVANCE VALUE

(71) Applicant: Lenovo (Beijing) Ltd., Beijing (CN)

(72) Inventors: Hongmei Liu, Changping District (CN); Zhi Yan, Xicheng District (CN); Yuantao Zhang, Dongcheng District (CN); Bingchao Liu, Changping District (CN); Haiming Wang, Xicheng District (CN)

(73) Assignee: Lenovo (Beijing) Ltd., Beijing (CN)

( * ) Notice: Subject to any disclaimer, the term of this patent is extended or adjusted under 35 U.S.C. 154(b) by 592 days.

(21) Appl. No.: 18/004,513

(22) PCT Filed: Jul. 9, 2020

(86) PCT No.: PCT/CN2020/101102
§ 371 (c)(1),
(2) Date: Jan. 6, 2023

(87) PCT Pub. No.: WO2022/006820
PCT Pub. Date: Jan. 13, 2022

(65) Prior Publication Data
US 2023/0262632 A1     Aug. 17, 2023

(51) Int. Cl.
*H04W 56/00* (2009.01)
*H04L 5/00* (2006.01)
(Continued)

(52) U.S. Cl.
CPC ....... *H04W 56/0045* (2013.01); *H04L 5/0051* (2013.01); *H04W 72/1268* (2013.01); *H04W 72/23* (2023.01)

(58) Field of Classification Search
CPC ................................................. H04W 56/0045
See application file for complete search history.

(56) References Cited

U.S. PATENT DOCUMENTS

2019/0124636 A1    4/2019  Jiang et al.
2020/0053752 A1*   2/2020  Huang .............. H04W 56/0005
(Continued)

FOREIGN PATENT DOCUMENTS

WO        2019080056 A1    5/2019

OTHER PUBLICATIONS

Lenovo , et al., "Discussion on NTN TA indication", 3GPP TSG RAN WG1 #102-e, R1-2005834, e-Meeting [retrieved Dec. 27, 2022]. Retrieved from the Internet <https://www.3gpp.org/ftp/tsg_ran/WG1_RL1/TSGR1_102-e/Docs>., Aug. 2020, 4 Pages.
(Continued)

*Primary Examiner* — Jason E Mattis
(74) *Attorney, Agent, or Firm* — FIG. 1 Patents

(57) ABSTRACT

Embodiments of the present application are related to a method and apparatus for determining timing advance value. According an embodiment of the present application, an exemplary method includes: receiving association information between timing advance (TA) value for uplink transmission and downlink reference signal (RS), wherein each TA value is associated with an index of at least one corresponding downlink RS; determining a downlink RS index for associating with a TA value for uplink transmission; and determining the TA value for uplink transmission based on the association information. Accordingly, embodiments of the present application can indicate and determine TA value with reduced signaling overhead.

20 Claims, 7 Drawing Sheets

(51) Int. Cl.
  *H04W 72/1268*  (2023.01)
  *H04W 72/23*   (2023.01)

(56)    References Cited

U.S. PATENT DOCUMENTS

| | | | |
|---|---|---|---|
| 2020/0153500 A1 | 5/2020 | Kim et al. | |
| 2020/0236715 A1* | 7/2020 | Akkarakaran | H04W 56/0045 |
| 2021/0083737 A1* | 3/2021 | Capdevielle | H04B 17/318 |
| 2021/0352613 A1* | 11/2021 | Yoon | H04W 56/001 |
| 2021/0359745 A1* | 11/2021 | Farag | H04L 1/0071 |
| 2022/0417885 A1* | 12/2022 | Dai | H04W 56/0045 |
| 2023/0048329 A1* | 2/2023 | Kang | H04L 5/0048 |
| 2023/0095079 A1* | 3/2023 | Wu | H04B 7/18563 |
| 2023/0101531 A1* | 3/2023 | Low | H04W 72/563 |
| | | | 370/329 |
| 2023/0189254 A1* | 6/2023 | Go | H04B 7/06 |
| | | | 370/329 |
| 2023/0328597 A1* | 10/2023 | Xiong | H04L 5/0051 |
| | | | 370/331 |

OTHER PUBLICATIONS

Nokia , "Doppler Compensation, Uplink Timing Advance and Random Access in NTN", 3GPP TSG RAN WG1 Meeting #97, R1-1906087, Reno, USA [retrieved Dec. 27, 2022]. Retrieved from the Internet <https://www.3gpp.org/ftp/tsg_ran/WG1_RL1/TSGR1_97/Docs>., May 2019, 13 Pages.

PCT/CN2020/101102 , "International Preliminary Report on Patentability", PCT Application No. PCT/CN2020/101102, Jan. 19, 2023, 5 pages.

PCT/CN2020/101102 , "International Search Report and Written Opinion", PCT Application No. PCT/CN2020/101102, Apr. 9, 2021, 6 pages.

* cited by examiner

202 receiving association information between TA value for uplink transmission and downlink RS, wherein each TA value is associated with an index of at least one corresponding downlink RS

204 determining a downlink RS index for associating with a TA value for uplink transmission

206 determining the TA value for uplink transmission based on the association information

FIG. 2

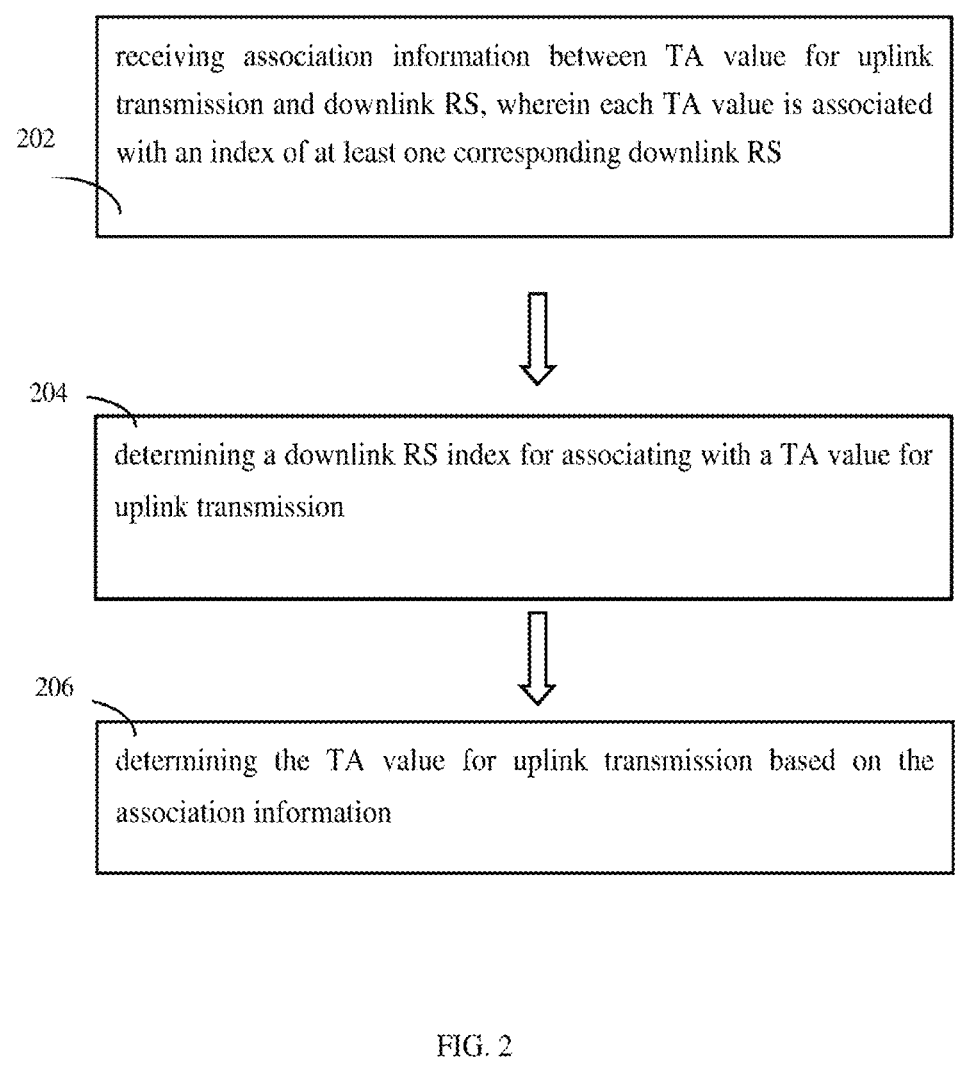

302 — transmitting association information between TA value for uplink transmission and downlink RS, wherein each TA value is associated with an index of at least one corresponding downlink RS

304 — determining a downlink RS index for associating with a TA value for uplink transmission 306 — determining the TA value for uplink transmission based on the association information

FIG. 3

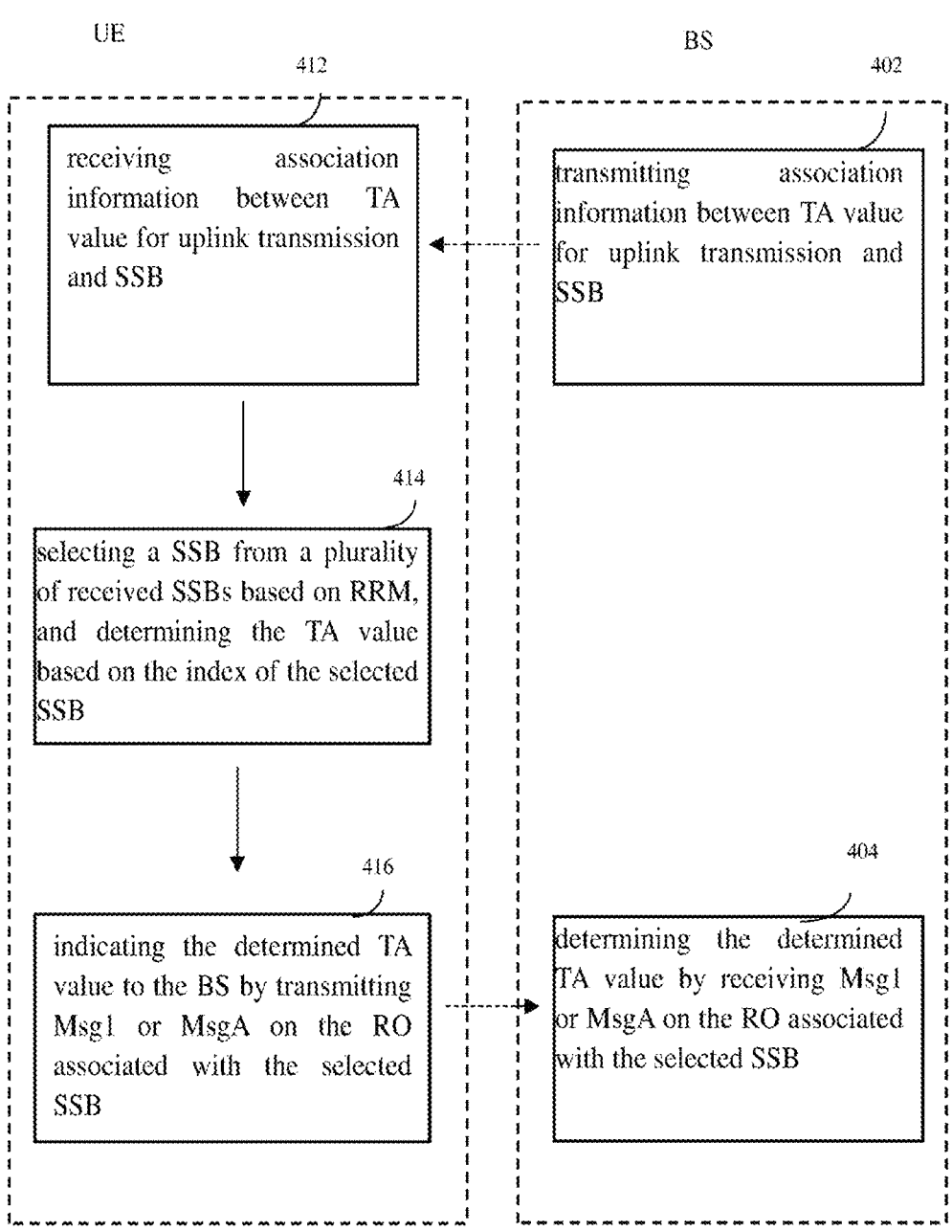

UE
412 receiving          association
information     between     TA
value for uplink transmission
and SSB

414 selecting a SSB from a plurality
of received SSBs based on RRM,
and    determining    the    TA    value
based on the index of the selected
SSB

416 indicating   the   determined   TA
value to the BS by transmitting
Msg1   or   MsgA   on   the   RO
associated   with   the   selected
SSB

BS
402 transmitting          association
information between TA value
for   uplink   transmission   and
SSB

404 determining    the    determined
TA value by receiving Msg1
or MsgA on the RO associated
with the selected SSB

FIG. 4

PUCCH reource                              association

MAC CE                    TCI-State#01              association for Cell Id#2

METHOD AND APPARATUS FOR DETERMINING TIMING ADVANCE VALUE

TECHNICAL FIELD

Embodiments of the present application are directed to wireless communication technology, and more particularly directed to timing advance (TA) value determination and indication.

BACKGROUND

Wireless communication systems are widely deployed to provide various telecommunication services such as telephony, video, data, messaging, broadcasts, and so on. Wireless communication systems may employ multiple access technologies capable of supporting communication with multiple users by sharing available system resources (e.g., time, frequency, and power). Examples of wireless communication systems may include fourth generation (4G) systems such as long term evolution (LTE) systems, LTE-advanced (LTE-A) systems, or LTE-A Pro systems, and fifth generation (5G) systems which may also be referred to as new radio (NR) systems.

To extend the coverage and availability of wireless communication systems (e.g., 5G systems), satellite and high-altitude platforms may be utilized as relay devices in communications related to ground devices such as user equipment (UE). Network or segment of network using radio frequency (RF) resources on board a satellite or an airborne aircraft may be referred to as a non-terrestrial network (NTN). In an NTN network, some or all functions of a base station (BS) may be deployed in a satellite or an airborne aircraft.

However, there is large propagation delay in the NTN network due to the high attitude of satellites. Thus, 3GPP needs to propose technical solutions concerning on indicating TA value in the way of reducing the signaling overhead on TA command(s) so that the TA value can be precisely and consistently determined both in the network side and the remote unit (e.g. UE side).

SUMMARY OF THE DISCLOSURE

One object of the present application is to provide a method and apparatus for determining TA value during wireless transmission.

According to an embodiment of the present application, a method includes: receiving association information between TA value for uplink transmission and downlink reference signal (RS), wherein each TA value is associated with an index of at least one corresponding downlink RS; determining a downlink RS index for associating with a TA value for uplink transmission; and determining the TA value for uplink transmission based on the association information.

According to another embodiment of the present application, a method includes: transmitting association information between TA value for uplink transmission and downlink RS, wherein each TA value is associated with an index of at least one corresponding downlink RS; determining a downlink RS index for associating with a TA value for uplink transmission; and determining the TA value for uplink transmission based on the association information.

In some embodiments of the present application, the index of at least one corresponding downlink RS is at least one RS index or a group index of a RS group. For example, the downlink RS may be synchronization signal block (SSB) or channel state information-reference signal (CSI-RS) resource.

According to some embodiments of the present application, the association information between TA value for uplink transmission and CSI-RS resource may be received by radio resource control (RRC) signaling. The association information between TA value for uplink transmission and SSB may be received by at least one of system information block (SIB), RRC signaling and medium access control (MAC) control element (CE). Each TA value may be associated with the index of at least one corresponding downlink RS by correspondingly ordering of TA values in a first list and indexes of downlink RSs in a second list. The association information may be configured per cell. In the case that the at least one downlink RS is configured with a component carrier (CC) index, the method may include determining the association information based on the CC indicated by the configured CC index. In some embodiments of the present application, the method may include determining the association information based on a default CC index.

According to some embodiments of the present application, determining a downlink RS index for associating with a TA value may include: selecting a SSB from a plurality of received SSBs based on radio resource measurement (RRM), and an index of the selected SSB is the determined downlink RS index. An exemplary method may include: indicating the TA value for uplink transmission by transmitting Msg1 or MsgA on a physical random access channel/random access channel (PRACH/RACH) occasion (RO) associated with the selected SSB.

According to some other embodiments of the present application, the method may include receiving a sounding reference signal (SRS) resource indicator (SRI), determining a pathloss reference RS identifier, and determining the downlink RS index for associating with the TA value based on the pathloss reference RS identifier. The SRI may be received by downlink control information (DCI).

According to some yet other embodiments of the present application, the method may include may include: receiving a pathloss reference RS identifier associated with the SRS resource set, and determining the downlink RS index for associating with the TA value based on the pathloss reference RS identifier. The pathloss reference RS identifier associated with the SRS resource set is received by receiving RRC signaling or MAC CE.

According to some yet other embodiments of the present application, the method may include receiving a pathloss reference RS identifier associated with a physical uplink control channel (PUCCH) resource, and determining the downlink RS index for associating with the TA value based on the pathloss reference RS identifier. The pathloss reference RS identifier associated with the PUCCH resource may be received by at least one of RRC signaling and MAC CE.

According to some yet other embodiments of the present application, the method may include receiving spatial relation information associated with a PUCCH resource, and determining the downlink RS index for associating with the TA value based on the spatial relation information. The spatial relation information associated with the PUCCH resource may be received by at least one of RRC signaling and MAC CE.

In some embodiments of the present application, determining a downlink RS index for associating with a TA value may include: in case that the downlink RS is configured with a CC index, locating the downlink RS in the CC indicated by the configured CC index. In some other embodiments, determining a downlink RS index for associating with a TA value may include: locating the downlink RS in a default CC. The default CC is an activated CC, e.g., an activated CC for physical downlink control channel (PDCCH) reception.

In some embodiments of the present application, determining a downlink RS index for associating with a TA value may include in the case that the downlink RS is configured with a bandwidth part (BWP) index, locating the downlink RS in a BWP indicated by the configured BWP index. In some other embodiments of the present application, determining a downlink RS index for associating with a TA value may include locating the downlink RS in a default BWP. The default BWP may be an activated downlink BWP.

According to some embodiments of the present application, the downlink RS index for associating with the TA value may be determined based on a transmission configuration indication (TCI) state of a control resource set (CORESET) where PDCCH scheduling physical uplink shared channel (PUSCH) or triggering PUCCH feedback locates. In the case that there are two or more downlink RSs associated with the TCI state, an index of one RS with quasi co-location (QCL) TypeD of the two or more RSs is determined for associating with the TA value. In the case that there is only one RS associated with the TCI state, an index of the only one RS is determined for associating with the TA value. The TA value is used for at least one of uplink transmission scheduled or triggered by the PDCCH.

According to some yet other embodiments of the present application, in the case that no information for updating the TA value is received, the TA value is determined by a latest TA value, wherein the latest TA value is a TA value of a latest uplink transmission, or a TA value indicated by latest DCI.

According to some yet other embodiments of the present application, in the case that there are a plurality of uplink transmissions associated with different TA values, the TA value may be determined by the uplink transmission with a highest priority of the plurality of uplink transmissions or is determined by a default TA value, e.g., a default TA value configured by RRC signaling. The plurality of uplink transmissions may have overlapped time domain resources. A priority of an uplink transmission of the plurality of uplink transmissions is predefined in specification(s) or configured by RRC signaling. For example, a priority of each uplink transmission of the plurality of uplink transmissions is determined by a time domain starting position of the uplink transmission, e.g., the priority of an uplink transmission with the largest time domain starting position is the highest, or, the priority of an uplink transmission with the smallest time domain starting position is the highest. In some embodiments of the present application, a priority of each uplink transmission of the plurality of uplink transmissions may be determined by a time domain starting position of a DCI scheduling or triggering the uplink transmission, e.g., the priority of an uplink transmission scheduled or triggered by a latest DCI is the highest.

In addition, some embodiments of the present application also provide apparatuses for performing a method, e.g., a method as stated above.

Embodiments of the present application can solve the technical problems concerning on TA value indication and determination, e.g., in a NTN network with reduced signaling overhead.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope.

FIG. 2 is a flow chart illustrating an exemplary method for determining TA value during wireless transmission according to an embodiment of the present application;

FIG. 3 is a flow chart illustrating an exemplary method for determining TA value during wireless transmission according to another embodiment of the present application;

FIG. 4 is a flow chart illustrating an exemplary method for determining TA value during wireless transmission according to an embodiment of the present application;

DETAILED DESCRIPTION

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

Reference will now be made in detail to some embodiments of the present application, examples of which are illustrated in the accompanying drawings. To facilitate understanding, embodiments are provided under specific network architecture and new service scenarios, such as 3GPP 5G (NR), 3GPP LTE, and so on. It is contemplated that along with the developments of network architectures and new service scenarios, all embodiments in the present application are also applicable to similar technical problems; and moreover, the terminologies recited in the present application may change, which should not affect the principle of the present application.

Figure 1:
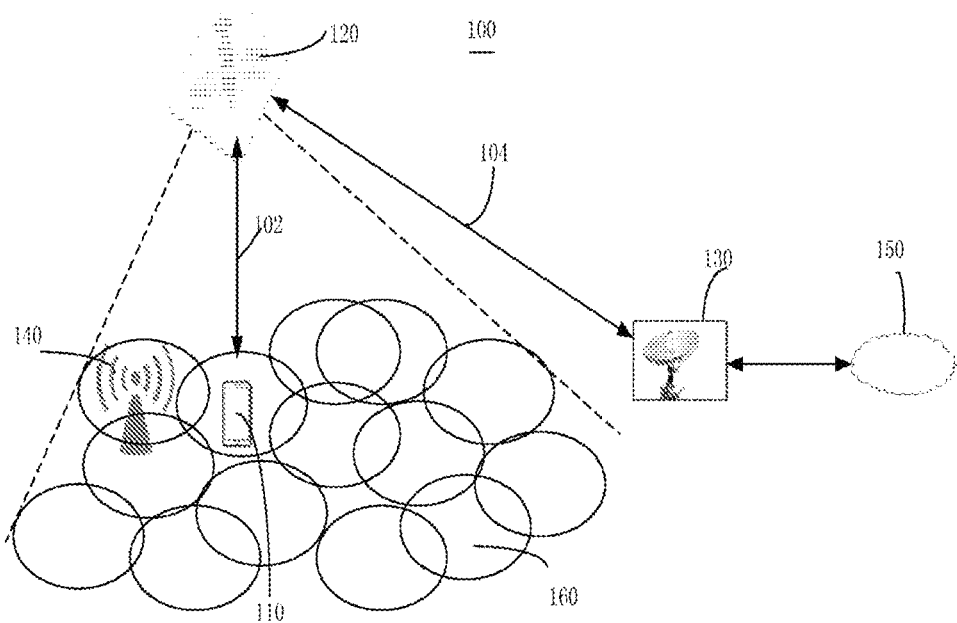
FIG. 1 illustrates a wireless communication system according to an embodiment of the present application.

FIG. 1 is a schematic diagram illustrating an exemplary wireless communication system according to some embodiments of the present application.

Referring to FIG. 1, the shown exemplary wireless communication system is an exemplary NTN network 100 in which the techniques, processes and methods described herein can be implemented, in accordance with various embodiments of the present application. In other embodiments of the present application, the wireless communication system may be other type of networks.

Generally, to extend the coverage and availability of wireless communication systems, some or all functions of a BS may be deployed in a satellite. That is, in the NTN network, a satellite may be also referred to as a BS. For example, a satellite may generate beams over a certain service area, which may also be referred to as a cell coverage area. The concept of cell with respect to a terrestrial BS may similarly apply to a satellite serving as a BS. Such network or segment of network using RF resources on board a satellite or an airborne aircraft may be referred to as an NTN network. Hereafter, the BS(s) illustrated in the specification all cover any type of devices with the substantial function of a BS, including a satellite 120, a terrestrial BS 140 or the like.

As shown in FIG. 1, the NTN network 100 includes at least one UE 110 and at least one satellite 120. The UE(s) 110 communicates with the satellite 120 over a service link 102, which has both an uplink from the UE 101 to the satellite 120 and a downlink from the satellite 120 to the UE 110. The UE(s) 110 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), internet of things (IoT) devices, or the like. According to some embodiments of the present disclosure, the UE(s) 110 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present disclosure, the UE(s) 110 includes wearable devices, such as smart watches, fitness bands, optical head-mounted displays, or the like. Moreover, the UE(s) 110 may be referred to as a subscriber unit, a mobile, a mobile station, a user, a terminal, a mobile terminal, a wireless terminal, a fixed terminal, a subscriber station, a user terminal, or a device, or described using other terminology used in the art.

Satellite(s) 120 may include low earth orbiting (LEO) satellites, medium earth orbiting (MEO) satellites, geostationary earth orbiting (GEO) satellites, as well as highly elliptical orbiting (HEO) satellites. In some embodiments of the present application, alternatively, a satellite 120 may be an unmanned aircraft systems (UAS) platform. The UAS platform(s) may include tethered UAS and lighter than air (LTA) UAS, heavier than air (HTA) UAS, and high altitude platform (HAP) UAS.

The satellite 120 may provide a plurality of geographic areas (footprint) 160 for serving UEs 110 located in one or more of the geographic areas. A geographic area 160 can be associated with a cell, and can also be associated with a beam. When the geographic area 160 is associated with a cell, it can be named as a "cell footprint." When the geographic area 160 is associated with a beam, it can be named as a "beam footprint." In FIG. 1, exemplary UE(s) may be a normal mobile terminal, which can wirelessly communicate with the satellite 120 via a communications link, such as service link or radio link in accordance with a NR access technology (e.g., a NR-Uu interface). As also shown in FIG. 1, the satellite 120 may also communicates with a gateway 130 or an on earth (terrestrial) BS 140 via a communication link, which may be a feeder link 102 or radio link in accordance with NR access technologies or other technologies. In accordance with various embodiments, the satellite 120 may be implemented with either a transparent or a regenerative payload. When the satellite 120 carries a "transparent" payload, it performs only radio frequency filtering, frequency conversion and/or amplification of signals on board. Hence, the waveform signal repeated by the satellite is un-changed. When a satellite carries a regenerative payload, in addition to performing radio frequency filtering, frequency conversion and amplification, it performs other signal processing functions such as demodulation/decoding, switching and/or routing, coding/decoding and modulation/demodulation on board as well. In other words, for a satellite with a regenerative payload, all or part of base station functions (e.g., a gNB, eNB, etc.) are implemented on board.

The gateway 130 may be coupled to a data network 150 such as, for example, the Internet, terrestrial public switched telephone network, mobile telephone network, or a private server network, etc. The gateway 130 and the satellite 120 communicate over a feeder link 120, which has both a feeder uplink from the gateway to the satellite 120 and a feeder downlink from the satellite 120 to the gateway 130. Although a single gateway 130 is shown, some implementations will include more gateways, such as five, ten, or more.

One or more terrestrial BSs 140 (i.e., not airborne or spaceborne) are provided within a typical terrestrial communication network, which provides geographical radio coverage, wherein the UEs 110 that can transmit and receive data within the radio coverage (cell coverage) of the terrestrial BS 140. In the terrestrial communication network, a terrestrial BS 140 and a UE 110 can communicate with each other via a communication link, e.g., via a downlink radio frame from the terrestrial BS 140 to the UE 110 or via an uplink radio frame from the UE 110 to the terrestrial BS 140.

Although a limited number of UEs 110 and satellites 120 etc., are illustrated in FIG. 1, it is contemplated that the wireless communication system 100 may include any number of UEs 110, satellites 120, and/or other network components.

According to some embodiments of the present application, the TA for a UE may include two parts: common TA (which is a TA value commonly configured per geographic area, and has been used in TS38.821) and differential TA. The common TA depends on the distance between the BS, e.g., a satellite and a reference point. The differential TA depends on the UE's location within the coverage area.

Regarding footprints generated by a single satellite, different footprints can be associated with different beams, and different footprints can be associated with the same or different cell identifiers. Consequently, there may be a group of footprints associated with different beams and sharing the same cell identifier. In this case, the common TA is associated with a footprint, which is associated with a specific beam. When a UE's associated geographic area 160 of a satellite 120 is changed due to the movement of anyone of the UE 110 and satellite 120, a common TA value for uplink transmission of the UE 110 would be updated accordingly. However, there is no technical solution on how to indicate and determine the common TA value for uplink transmission of a UE 110 at different geographic cells 160.

Methods and apparatuses according to embodiments of the present application can at least solve the technical problem concerning on how to indicate a TA value, e.g., a common TA value for uplink transmission of a UE in an NTN network or the like. The uplink transmission of a UE may include uplink channel and uplink RS etc. An exemplary uplink transmission may be PRACH, PUCCH, PUSCH, or SRS etc.

FIG. 2 is a flow chart illustrating an exemplary method for determining TA value during wireless transmission according to an embodiment of the present application, which can be performed a UE 110 or the like.

Referring to FIG. 2, according to an embodiment of the present application, an exemplary method for determining TA value may include: receiving association information between TA value for uplink transmission and downlink RS, e.g., from a BS in step 202, wherein each TA value is associated with an index of at least one corresponding downlink RS. An exemplary TA value may be a common TA value as recited in TS38.821. In some embodiments of the present application, the index of at least one corresponding downlink RS is at least one RS index or a group index of a RS group. For example, in an embodiment of the present application, the at least one downlink RS may be a SSB or a CSI-RS resource. In another embodiment of the present application, the at least one downlink RS may be a group of SSBs including at least one SSB or a group of CSI-RS resources including at least one CSI-RS resources. The downlink RS within a downlink RS group is associated with a TA value based on the association information between a TA value with the downlink RS group.

According to some embodiments of the present application, the association information may only include the association information between TA value and SSB index (or SSB group index), only include the association information between TA value and CSI-RS resource index (or CSI-RS resource group index), or include them both or more. The association information between TA value for uplink transmission and CSI-RS resource may be received by at least one of RRC signaling and MAC CE signaling. The association information between TA value for uplink transmission and SSB may be received by at least one of SIB, RRC signaling and MAC CE. The association information can be provided in various manners. For example, a TA value may be associated with a downlink RS by ordering of TA value and downlink RS in the corresponding list. In an embodiment of the present application, each TA value may be associated with the index of at least one corresponding downlink RS by correspondingly ordering of TA values in a first list and indexes of downlink RSs in a second list. For example, such association information may be provided as the following: a TA value list (the first list) is {3s, 10s, 20s}, and a SSB index list (the second list) is {SSB index #1, SSB index #3, SSB index #5}, wherein, each element in a respective list are associated with each other in sequence, e.g., the first element, "3s" in the TA value list is associated with the first element, "SSB index #1" in the SSB index list, the second element, "10s" in the TA value list is associated with the second element, "SSB index #3" in the SSB index list, and so on. When the downlink RS is CSI-RS resource, a similar manner can be used. For example, such association information between TA value and CSI-RS resource group may be provided as the following: a TA value list (the first list) is {3s, 10s, 20s}, and a CSI-RS resource group index list (the second list) is {CSI-RS resource group index #2, CSI-RS resource group index #3, CSI-RS resource group index #4}. That is, the TA value associated with CSI-RS resource group index #2 is 3s . . . and the TA value associated with CSI-RS resource group index #4 is 20s.

In some embodiments of the present application, the association information may be configured per cell. In the case that the at least one downlink RS is configured with a CC index, the method may include determining the association information based on the CC indicated by the configured CC index. In some embodiments of the present application, the method may include determining the association information based on a default CC index.

In some embodiments of the present application, when a TA value for uplink transmission will be determined, a downlink RS index for associating with a TA value for uplink transmission will be firstly determined in step 204. After the downlink RS index is determined, the TA value for uplink transmission will be determined based on the association information in step 206. For example, based on the above recited exemplary association information between TA value and SSB, when the downlink RS index is "SSB index #5," the TA value will be determined as "20s."

On the network side, a similar TA value determination procedure can be performed. For example, FIG. 3 is a flow chart illustrating an exemplary method for determining TA value during wireless transmission according to an embodiment of the present application, which can be performed on a BS (e.g., a terrestrial BS, a satellite etc.) or the like.

Association information between TA value for uplink transmission and downlink RS may be firstly configured in the network side, which is the same as the above recited. Considering the configuration information consistency between the network side and remote unit, details on the configuration information will be omitted in the network side. Referring to FIG. 3, according to an embodiment of the present application, an exemplary method for determining TA value may include: transmitting association information between TA value for uplink transmission and downlink RS in step 302, e.g., from a BS to a UE, wherein each TA value is associated with an index of at least one corresponding downlink RS. When a TA value for uplink transmission to be determined, a downlink RS index for associating with a TA value for uplink transmission will be determined in step 304. When the downlink RS index is determined, the TA value for uplink transmission will be determined based on the association information in step 306.

In different scenarios, a downlink RS index for associating with a TA value may be determined in different manners. Accordingly, more details will be illustrated hereafter in view of some exemplary scenarios.

In an exemplary scenario, when a UE is turned on, the UE will transmit a RACH/PRACH signal to the network side e.g., a BS. According to some embodiments of the present application, during a PRACH/RACH procedure, a TA value for uplink transmission may be firstly determined by a UE and then indicated to the network side so that the network side can determine a consistent TA value.

FIG. 4 is a flow chart illustrating an exemplary method for determining TA value during wireless transmission according to an embodiment of the present application. Although the method is illustrated in a system level by a UE and a BS (e.g., the UE 110 and the satellite 120 shown in FIG. 1), persons skilled in the art can understand that the method implemented in the UE and that implemented in the BS can be separately implemented and incorporated by other apparatus with the like functions.

Referring to FIG. 4, according to some embodiments of the present application, the downlink RS for associating with TA value is SSB. In NR, different SSBs are associated with different beams and a UE can select a certain beam (downlink spatial domain filter) and send Msg1/MsgA on a RO associated with that beam (transmission and reception use the same spatial domain filter). NR R15 has defined a specific mapping relationship between SSBs (or SSB indices for identifying the SSBs) and ROs, so that the network side can figure out which SSB or beam that the UE has selected by detecting which RO the UE sent Msg1/MsgA on. In other words, a RO is associated with an SSB or SSB index to implicitly indicate the selected beam for downlink transmission and if applied, as well as uplink transmission.

In step 402, besides a plurality of SSBs, association information between TA value for uplink transmission and SSB may be transmitted from a BS to a UE (which does not mean at the same time, hereafter the same). In step 412, the UE receives the association information and the plurality of SSBs. When a PRACH/RACH procedure is necessary, a downlink RS index for associating with a TA value for uplink is to be determined. The UE may select a SSB from a plurality of received SSBs based on RRM. Accordingly, the UE can determine a TA value for uplink transmission based on the index of the selected SSB in step 414. In addition, based on the selected SSB, the UE may determine a RO associated with the selected SSB. In step 416, the TA value for uplink transmission will be indicated to the BS by transmitting Msg1 or MsgA on the RO associated with the selected SSB. In step 404, the BS may determine the RO based on the received Msg1 or MsgA. Based on the determined RO, the BS will determine the SSB index associated with the RO, and accordingly, the TA value for uplink transmission from the UE will be determined based on association information between TA value and SSB.

According to some other embodiments of the present application, the downlink RS index for associating with a TA value for uplink transmission may be determined based on a pathloss reference RS identifier. The TA value may be determined firstly in the network side and then indicated to the UE so that the UE can determine a TA value consistent with the BS.

In some embodiments of the present application, the pathloss reference RS identifier may be associated with SRI, which may be transmitted by the BS to the UE via DCI, e.g., DCI 0-1, or DCI 0-2. Exemplary applicable scenarios include DCI 0-1 (or DCI 0-2) scheduled codebook (or non-codebook) based uplink transmission, and DCI 0-1 (or DCI 0-2) triggered configured grant PUSCH etc. For a BS, it may transmit a SRI, determine a pathloss reference RS identifier based on the transmitted SRI, and determine the downlink RS index for associating with the TA value based on the pathloss reference RS identifier. For a UE, it may determine a pathloss reference RS identifier based on the received SRI, and determine the downlink RS index for associating with the TA value based on the pathloss reference RS identifier.

Figure 5A:
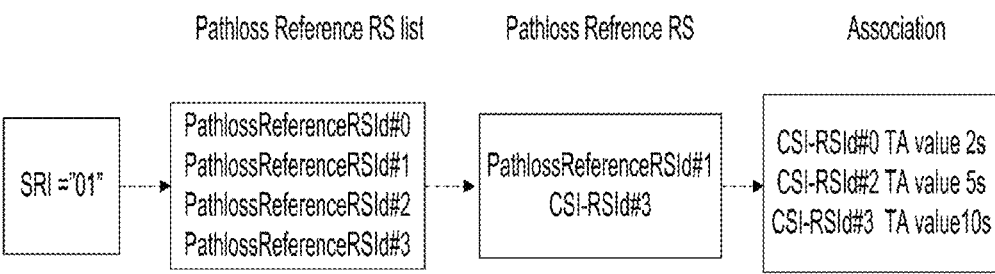
FIGS. 5a and 5b respectively illustrate an exemplary procedure for determining a TA value according to some embodiments of the present application.

FIG. 5a illustrates an exemplary procedure for determining a TA value according to some embodiments of the present application, wherein the pathloss reference RS identifier is associated with SRI. As shown in FIG. 5a, a pathloss reference RS list with PathlossReferenceRSId #0, #1, #2, #3 is configured for UE, and SRI with bit "01" associates with PathlossReferenceRSId #1, that is, based on SRI with bit "01," PathlossReferenceRSId #1 is selected (determined). In the case that "PathlossReferenceRSId #1" is configured with a CSI-RS resource, e.g., "CSI-RSId #3," and CSI-RSId #3 is associated with a TA value "10s," the TA value for uplink transmission can be determined as 10s based on the pathloss reference RS identifier associated with SRI="01."

Figure 5B:
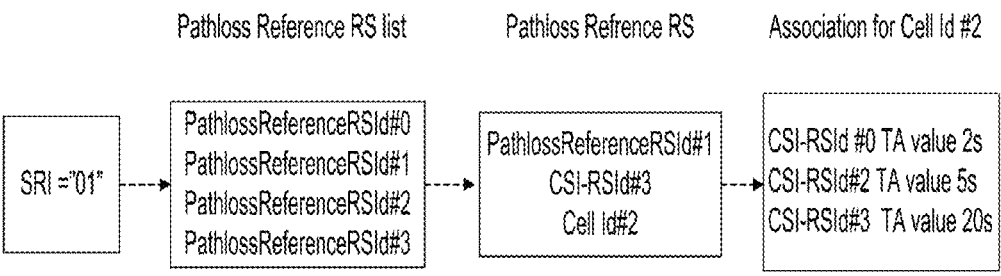

FIG. 5b illustrates another exemplary procedure for determining a TA value according to some embodiments of the present application, wherein the pathloss reference RS identifier is also associated with SRI. However, besides the configuration information similar to that provided in FIG. 5a, the association information configured per cell is also be considered in FIG. 5b. For example, the CSI-RSId #3 can be located in a configured cell, i.e., Cell Id #2. Accordingly, the association information between CSI-RS resource and TA value for Cell id #2 is adopted for TA determination. Based on SRI with bit "01," PathlossReferenceRSId #1 is selected (determined). In the case that "PathlossReferenceRSId #1" is configured with a CSI-RS resource, i.e., "CSI-RSId #3" for the cell "Cell Id #2" and CSI-RSId #3 is associated with a TA value "20s," the TA value for uplink transmission can be determined as 20s based on the pathloss reference RS identifier associated with SRI="01" and Cell Id #2.

In some other embodiments of the present application, the pathloss reference RS identifier may be determined based on the SRS resource set, which may be transmitted from a BS to a UE, e.g., via RRC signaling or MAC CE. For a BS, it may transmit a pathloss reference RS identifier associated with the SRS resource set, and determine the downlink RS index for associating with the TA value based on the pathloss reference RS identifier. For a UE, it may receive a pathloss reference RS identifier associated with the SRS resource set, and determine the downlink RS index for associating with the TA value based on the pathloss reference RS identifier.

Figure 6:
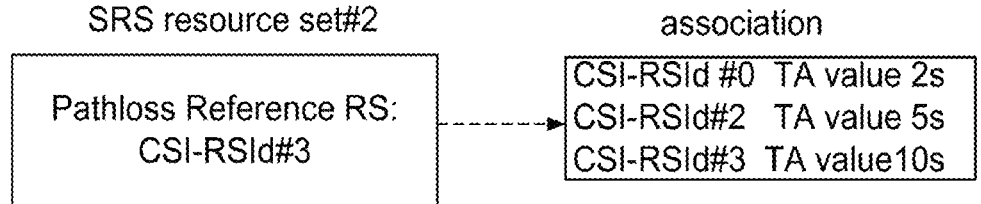
FIG. 6 illustrates an exemplary procedure for determining a TA value according to some embodiments of the present application.

FIG. 6 illustrates an exemplary procedure for determining a TA value according to some embodiments of the present application, wherein the pathloss reference RS identifier is associated with a SRS resource set. As shown in FIG. 6, SRS resource set #2 is configured with a pathloss reference RS associated with CSI-RSId #3, and CSI-RSId #3 is associated with a TA value "10s" based on the association information, and accordingly, a TA value "10s" is adopted when SRS resource set #2 is to be transmitted in a UE (or received in the BS).

In some embodiments of the present application, the downlink RS index for associating with a TA value for uplink transmission may be determined based on pathloss reference RS identifier associated with a PUCCH resource, which may be transmitted from the BS to the UE e.g., by at least one of RRC signaling and MAC CE. For a BS, it may transmit a pathloss reference RS identifier associated with a PUCCH resource, and determine the downlink RS index for associating with the TA value based on the pathloss reference RS identifier. For a UE, it may receive a pathloss reference RS identifier associated with a PUCCH resource, and determine the downlink RS index for associating with the TA value based on the pathloss reference RS identifier. In some embodiments of the present application the pathloss reference RS identifier associated with a PUCCH resource can be indicated a BS to a UE by information element (IE) "PUCCH-PathlossReferenceRS-Id."

Figure 7:
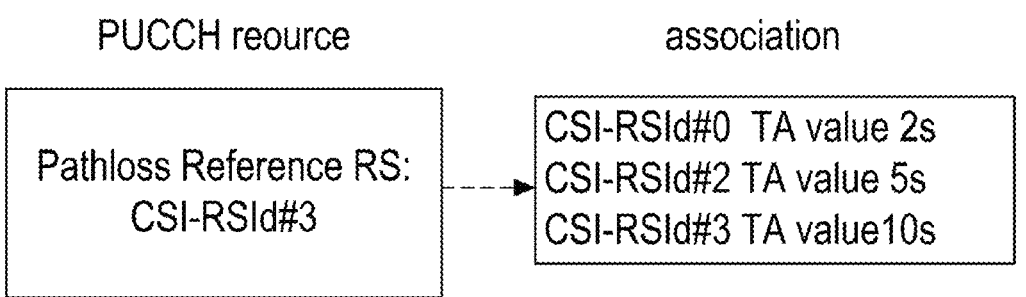
FIG. 7 illustrates an exemplary procedure for determining a TA value according to some embodiments of the present application.

FIG. 7 illustrates an exemplary procedure for determining a TA value according to some embodiments of the present application, wherein the downlink RS index for associating with a TA value for uplink transmission is determined based on pathloss reference RS identifier associated with a PUCCH resource. As shown in FIG. 7, CSI-RSId #3 is indicated in a pathloss reference RS, and accordingly the TA value "10s" is determined based on the association information.

According to some yet other embodiments of the present application, the downlink RS index for associating with a TA value for uplink transmission may be determined based on spatial relation information associated with a PUCCH resource, which may be transmitted from the BS to the UE e.g., by at least one of RRC signaling and MAC CE. For a BS, it may transmit spatial relation information associated with a PUCCH resource, and determine the downlink RS index for associating with the TA value based on the spatial relation information. For a UE, it may receive spatial relation information associated with a PUCCH resource, and determine the downlink RS index for associating with the TA value based on the spatial relation information. The spatial relation information associated with a PUCCH resource can be indicated by a BS to a UE by IE "Spatial-RelationInfo" for a PUCCH resource. The determination procedure based on spatial relation information associated with a PUCCH resource is similar to that based on pathloss reference RS identifier associated with a PUCCH resource.

In some embodiments of the present application, determining a downlink RS index for associating with a TA value may include: in case that the downlink RS is configured with a CC index, locating the downlink RS in the CC indicated by the configured CC index. In some other embodiments, determining a downlink RS index for associating with a TA value may include: locating the downlink RS in a default CC. The default CC is an activated CC, e.g., an activated CC for PDCCH reception in the UE, or an activated CC for PDCCH transmission in the BS.

In some embodiments of the present application, determining a downlink RS index for associating with a TA value may include in the case that the downlink RS is configured with a BWP index, locating the downlink RS in a BWP indicated by the configured BWP index. In some other embodiments of the present application, determining a downlink RS index for associating with a TA value may include locating the downlink RS in a default BWP. The default BWP may be an activated downlink BWP.

According to some other embodiments of the present application, the TA value is used for at least one of uplink transmission scheduled or triggered by the PDCCH. In some embodiments of the present application, the downlink RS index for associating with the TA value may be determined based on a TCI state of a CORESET where PDCCH scheduling PUSCH or triggering PUCCH feedback locates. For example, since the PDCCH can schedule PUSCH, the TA value of the PUSCH can be determined by the TCI-state of the PDCCH. In another example, since the PDCCH can schedule PDSCH, and PUCCH will provide ACK/NACK (A/N) feedback, the TA value of PUCCH carrying the feedback can be determined by the TCI-state. In the case that there are two or more downlink RSs associated with the TCI state, an index of one downlink RS with QCL TypeD of the two or more downlink RSs is determined for associating with the TA value. In the case that there is only one downlink RS associated with the TCI state, an index of the only one downlink RS is determined for associating with the TA value.

In some embodiments of the present application, cell index and downlink BWP index may also be contained in TCI state configuration, and accordingly association between downlink RS index and TA value of the corresponding cell index can be adopted.

Figure 8:
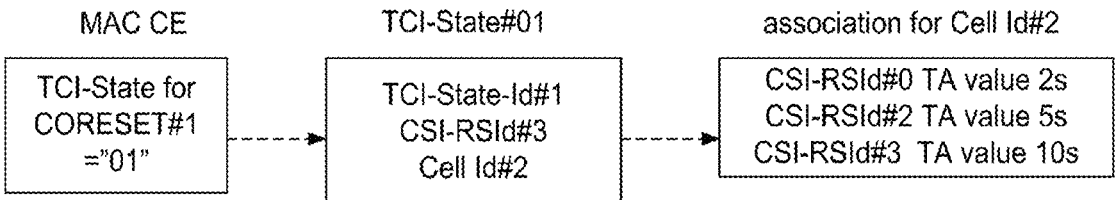
FIG. 8 illustrates an exemplary procedure for determining a TA value according to some embodiments of the present application.

FIG. 8 illustrates an exemplary procedure for determining a TA value according to some embodiments of the present application, wherein the downlink RS index for associating with a TA value for uplink transmission is determined based on a TCI state of a CORESET where PDCCH scheduling PUSCH or triggering PUCCH feedback locates. As shown in FIG. 8, TCI state for CORESET #1 is "01," PDCCH scheduling PUSCH is located in CORESET #1, and TCI-state "01" is associated with CSI-RSId #3 in Cell Id #2. Accordingly, based on the CSI-RS resource index to common TA association in Cell Id #2, TA value "10s" can be determined for PUSCH. When the PDCCH is to schedule PDSCH with TCI-state "01" for Cell Id #2, PUCCH carrying feedback is associated with the TA value "10s."

According to some yet other embodiments of the present application, in the case that no information for updating the TA value is received, the TA value is determined by a latest TA value. The latest TA value can be a TA value of a latest uplink transmission, or a TA value indicated by latest DCI.

For example, a latest uplink channel or uplink RS transmission may correspond to the time domain starting position of the uplink channel or uplink RS transmission, which may be PRACH, MsgA, Msg3, PUCCH, PUSCH, or SRS etc.

When the latest TA value is based on the latest downlink signaling, for different uplink transmission, the downlink signaling is different. Various exemplary downlink signaling are provided as follows:

For DCI scheduled PUSCH, it is the time domain starting position of the scheduling PDCCH For aperiodic SRS scheduled by DCI, it is the time domain starting position of the scheduling PDCCH For PUCCH carrying A/N, it is the time domain starting position of the PDCCH scheduling the corresponding PDSCH for A/N For MAC CE triggered PUCCH, semi-persistent SRS, it is the time domain starting position of MAC CE command or the time domain starting position of application of the MAC CE command For DCI activated configured grant PUSCH, it is the time domain starting position of the activating DCI For RRC configured periodic PUCCH, SRS, it is the time domain starting position of the RRC signaling or the time domain starting position of application of the RRC signaling.

Some more specific examples are provided as the following:

TA value for Msg3 and subsequent uplink signal/channel before RRC connection setup is determined by the TA value of Msg1/MsgA TA value for DCI 0-0 scheduled PUSCH transmission can be determined by the TA value indicated by SRI in a latest DCI 0-1 or DCI 0-2.

TA value for RRC configured periodic CSI reporting on PUCCH, RRC configured periodic SRS, PUCCH carrying SR, and RRC configured grant (CG) PUSCH can be determined by the common TA value for the latest PUSCH.

According to some yet other embodiments of the present application, in the case that there are a plurality of uplink transmissions associated with different TA values and with an overlapped time domain resource, the TA value may be determined by the uplink transmission with a highest priority of the plurality of uplink transmissions or is determined by a default TA value, e.g., a default TA value configured by RRC signaling. A priority of an uplink transmission of the plurality of uplink transmissions is predefined in specification(s) or configured by RRC signaling. For example, a priority of each uplink transmission of the plurality of uplink transmissions is determined by a time domain starting position of the uplink transmission, e.g., the priority of an uplink transmission with the largest time domain starting position is the highest, or, the priority of an uplink transmission with the smallest time domain starting position is the highest. In some embodiments of the present application, a priority of each uplink transmission of the plurality of uplink transmissions may be determined by a time domain starting position of a DCI scheduling or triggering the uplink transmission, e.g., the priority of an uplink transmission scheduled or triggered by a latest DCI is the highest.

Various exemplary priority embodiments are provided as follows:

a) Priory of Msg1>MsgA>SRS>PUCCH>PUSCH, or b) the following priority from high to low is adopted:

i. PRACH transmission on the PCell ii. PUCCH transmission with hybrid automatic repeat request (HARQ)-ACK information, and/or scheduling request (SR), and/or link recovery request (LRR), or PUSCH transmission with HARQ-ACK information iii. PUCCH transmission with CSI or PUSCH transmission with CSI iv. PUSCH transmission without HARQ-ACK information or CSI and, for Type-2 random access procedure, PUSCH transmission on the PCell v. SRS transmission, with aperiodic SRS having higher priority than semi-persistent and/or periodic SRS, or PRACH transmission on a serving cell other than the PCell vi. In the case of the same priority and for operation with carrier aggregation, the UE prioritizes power allocation for transmissions on the primary cell of the master cell group (MCG) or the secondary cell group (SCG) over transmissions on a secondary cell. In the case of the same priority order and for operation with two uplink carriers, the UE prioritizes power allocation for transmissions on the carrier where the UE is configured to transmit PUCCH. When PUCCH is not configured for any of the two uplink carriers, the UE prioritizes power allocation for transmissions on the non-supplementary uplink carrier.

Figure 9:
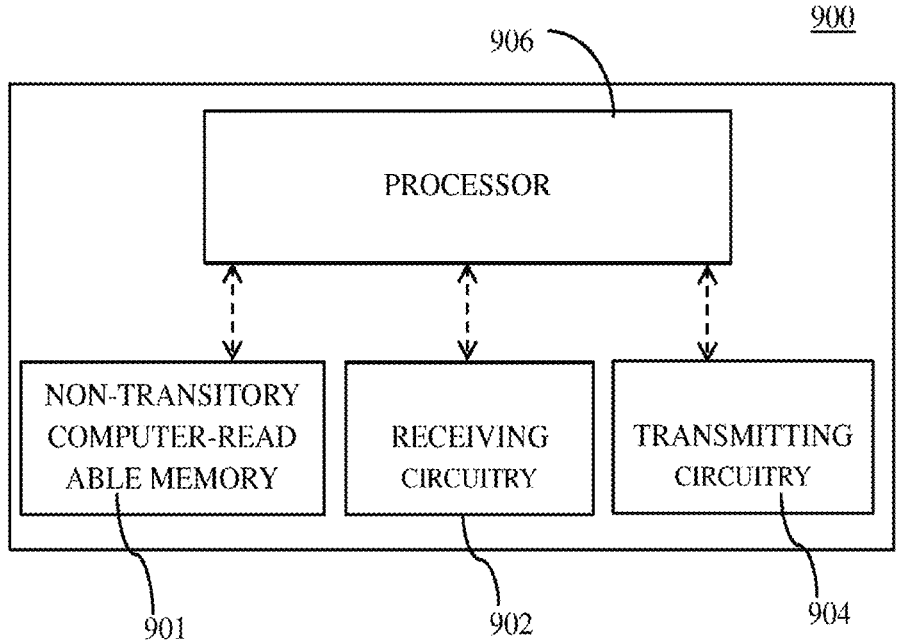
FIG. 9 illustrates a block diagram of an exemplary apparatus in accordance with some embodiments of the present application.

Embodiments of the present application also propose an apparatus for determining TA value during wireless transmission. FIG. 9 illustrates an example block diagram of an apparatus 900 according to some embodiments of the present application.

As shown in FIG. 9, the apparatus 900 may include at least one non-transitory computer-readable medium 901, at least one receiving circuitry 902, at least one transmitting circuitry 904, and at least one processor 906 coupled to the non-transitory computer-readable medium 901, the receiving circuitry 902 and the transmitting circuitry 904. The apparatus 900 may be a network side apparatus (e.g., a terrestrial BS or a satellite) configured to perform a method illustrated in FIG. 3 and the like, or a communication device (e.g., a UE) configured to perform a method illustrated in FIG. 2 or the like.

Although in this figure, elements such as the at least one processor 906, transmitting circuitry 904, and receiving circuitry 902 are described in the singular, the plural is contemplated unless a limitation to the singular is explicitly stated. In some embodiments of the present application, the receiving circuitry 902 and the transmitting circuitry 904 are combined into a single device, such as a transceiver. In certain embodiments of the present application, the apparatus 900 may further include an input device, a memory, and/or other components.

For example, in some embodiments of the present application, the non-transitory computer-readable medium 901 may have stored thereon computer-executable instructions to cause a processor to implement the method with respect to the UE as described above. For example, the computer-executable instructions, when executed, cause the processor 906 interacting with receiving circuitry 902 and transmitting circuitry 904, so as to perform the steps with respect to the UE depicted in FIGS. 2 and 4.

In some embodiments of the present application, the non-transitory computer-readable medium 901 may have stored thereon computer-executable instructions to cause a processor to implement the method with respect to the BS (including terrestrial BSs, satellites or the like) as described above. For example, the computer-executable instructions, when executed, cause the processor 906 interacting with receiving circuitry 902 and transmitting circuitry 904, so as to perform the steps with respect to the BS (including terrestrial BSs, satellites or the like) depicted in FIGS. 3 and 4.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes", "including", or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a", "an", or the like does not, without more constraints, preclude the existence of additional identical elements in the process, method, article, or apparatus that includes the element. Also, the term "another" is defined as at least a second or more. The term "having" and the like, as used herein, are defined as "including."

What is claimed is:

1. A user equipment (UE) for wireless communication, comprising:

at least one memory; and at least one processor coupled with the at least one memory and operable to cause the UE to:

receive first signaling that indicates association information between a plurality of timing advance (TA) values for an uplink transmission and a plurality of downlink reference signals (RSs), wherein each TA value of the plurality of TA values is associated with at least one downlink RS index corresponding to at least one downlink RS of the plurality of downlink RSs;

receive second signaling comprising at least one parameter corresponding to a downlink RS of the plurality of downlink RSs;

determine, based at least in part on a configuration between values of the at least one parameter and respective downlink RS indices associated with the plurality of downlink RSs, a downlink RS index associated with the downlink RS, wherein the at least one parameter is different from the downlink RS index; and determine a TA value of the plurality of TA values for the uplink transmission based at least in part on the downlink RS index and the association information.

2. The UE of claim 1, wherein the downlink RS index comprises at least one of an index of a single RS or a group index of a RS group.

3. The UE of claim 1, wherein the downlink RS comprises a synchronization signal block (SSB) or a channel state information-reference signal (CSI-RS) resource.

4. The UE of claim 3, wherein the association information is between the plurality of TA values and a plurality of CSI-RS resources, and wherein the first signaling comprises at least one of radio resource control (RRC) signaling or a medium access control (MAC) control element (CE).

5. The UE of claim 3, wherein the association information is between the plurality of TA values and a plurality of SSBs, and wherein the first signaling comprises at least one of a system information block (SIB), radio resource control (RRC) signaling, or a medium access control (MAC) control element (CE).

6. The UE of claim 1, wherein the association information is configured per cell, and wherein the at least one processor is further operable to cause the UE to:

determine, based at least in part on the downlink RS being configured with a component carrier (CC) index, the association information based at least in part on a CC indicated by the CC index; or determine the association information based at least in part on a default CC index.

7. The UE of claim 1, wherein to determine the downlink RS index, the at least one processor is operable to cause the UE to select a synchronization signal block (SSB) from a plurality of SSBs based at least in part on a radio resource measurement (RRM), wherein an index of the SSB comprises the downlink RS index.

8. The UE of claim 7, wherein the at least one processor is further operable to cause the UE to transmit, on a physical random access channel/random access channel (PRACH/RACH) occasion (RO) associated with the SSB, a Msg1 or MsgA that indicates the TA value.

9. The UE of claim 1, wherein the at least one parameter comprises a sounding reference signal (SRS) resource indicator (SRI), and wherein the at least one processor is further operable to cause the UE to determine, based at least in part on the SRI, a pathloss reference RS identifier, wherein the downlink RS index is based at least in part on the pathloss reference RS identifier.

10. The UE of claim 9, wherein the second signaling comprises a downlink control information (DCI).

11. The UE of claim 1, wherein the second signaling comprises one or more of radio resource control (RRC) signaling or medium access control (MAC) control element (CE), and wherein the at least one parameter comprises a pathloss reference RS identifier associated with a sounding reference signal (SRS) resource set.

12. The UE of claim 1, wherein the second signaling comprises at least one of radio resource control (RRC)

signaling or a medium access control (MAC) control element (CE), and wherein the at least one parameter comprises at least one of a pathloss reference RS identifier associated with a physical uplink control channel (PUCCH) resource or spatial relation information associated with the PUCCH resource.

13. The UE of claim 12, wherein to determine the downlink RS index, the at least one processor is operable to cause the UE to one or more of:

locate, based at least in part on the downlink RS being configured with a component carrier (CC) index, the downlink RS in a CC indicated by the CC index; or locate the downlink RS in a default CC, wherein the default CC is one or more of a first activated CC or a second activated CC for physical downlink control channel (PDCCH) reception.

14. The UE of claim 12, wherein to determine the downlink RS index, the at least one processor is operable to cause the UE to one or more of:

locate, based at least in part on the downlink RS being configured with a bandwidth part (BWP) index, the downlink RS in a BWP indicated by the BWP index; or locate the downlink RS in a default BWP, wherein the default BWP is an activated downlink BWP.

15. The UE of claim 1, wherein the downlink RS index is based at least in part on a transmission configuration indication (TCI) state of a control resource set (CORESET) associated with one or more physical downlink control channels (PDCCHs) scheduling a physical uplink shared channel (PUSCH) or triggering physical uplink control channel (PUCCH) feedback, wherein:

the uplink transmission is scheduled or triggered by the one or more PDCCHs;

the downlink RS index is associated with quasi co-location (QCL) TypeD of two or more downlink RSs based at least in part on the two or more downlink RSs being associated with the TCI state; and the downlink RS index is associated with one downlink RS based at least in part on the one downlink RS being associated with the TCI state.

16. The UE of claim 1, wherein the at least one processor is further operable to cause the UE to determine, based at least in part on no information for updating the TA value being received, the TA value by a latest TA value, wherein the latest TA value corresponds to at least one of a latest uplink transmission or a latest downlink control information (DCI).

17. The UE of claim 1, wherein the at least one processor is further operable to cause the UE to determine, based at least in part on a plurality of uplink transmissions being associated with different TA values, the TA value by the uplink transmission with a highest priority of the plurality of uplink transmissions or by a default TA value, and wherein one or more of:

the plurality of uplink transmissions have overlapping time domain resources;

respective priorities of the plurality of uplink transmissions are one or more of predefined or configured by RRC signaling;

the respective priorities of the plurality of uplink transmissions are based at least in part on a first time domain starting position of the uplink transmission;

the uplink transmission is associated with a greatest time domain starting position of the plurality of uplink transmissions;

the uplink transmission is associated with a smallest time domain starting position of the plurality of uplink transmissions;

the respective priorities of the plurality of uplink transmissions are based at least in part on a second time domain starting position of a downlink control information (DCI) scheduling or triggering the uplink transmission;

the uplink transmission is scheduled or triggered by a latest DCI; or the default TA value is configured by radio resource control (RRC) signaling.

18. A network equipment (NE) for wireless communication, comprising:

at least one memory; and at least one processor coupled with the at least one memory and operable to cause the NE to:

transmit first signaling that indicates association information between a plurality of timing advance (TA) values for an uplink transmission and a plurality of downlink reference signals (RSS), wherein each TA value of the plurality of TA values is associated with at least one downlink RS index corresponding to at least one downlink RS of the plurality of downlink RSs;

transmit second signaling comprising at least one parameter corresponding to a downlink RS of the plurality of downlink RSs;

determine, based at least in part on a configuration between values of the at least one parameter and respective downlink RS indices associated with the plurality of downlink RSs, a downlink RS index associated with the downlink RS, wherein the at least one parameter is different from the downlink RS index; and determine a TA value of the plurality of TA values for the uplink transmission based at least in part on the downlink RS index and the association information.

19. A method performed by a user equipment (UE), the method comprising:

receiving first signaling that indicates association information between a plurality of timing advance (TA) values for an uplink transmission and a plurality of downlink reference signals (RSs), wherein each TA value of the plurality of TA values is associated with at least one downlink RS index corresponding to at least one downlink RS of the plurality of downlink RSs;

receiving second signaling comprising at least one parameter corresponding to a downlink RS of the plurality of downlink RSs;

determining, based at least in part on a configuration between values of the at least one parameter and respective downlink RS indices associated with the plurality of downlink RSs, a downlink RS index associated with the downlink RS, wherein the at least one parameter is different from the downlink RS index; and determining a TA value of the plurality of TA values for the uplink transmission based at least in part on the downlink RS index and the association information.

20. A method performed by a network equipment (NE), the method comprising:

transmitting first signaling that indicates association information between a plurality of timing advance (TA) values for an uplink transmission and a plurality of downlink reference signals (RSs), wherein each TA value of the plurality of TA values is associated with at least one downlink RS index corresponding to at least one downlink RS of the plurality of downlink RSs;

transmitting second signaling comprising at least one parameter corresponding to a downlink RS of the plurality of downlink RSs;

determining, based at least in part on a configuration between values of the at least one parameter and respective downlink RS indices associated with the plurality of downlink RSs, a downlink RS index associated with the downlink RS, wherein the at least one parameter is different from the downlink RS index; and determining a TA value of the plurality of TA values for the uplink transmission based at least in part on the downlink RS index and the association information.

* * * * *